Figure 1:
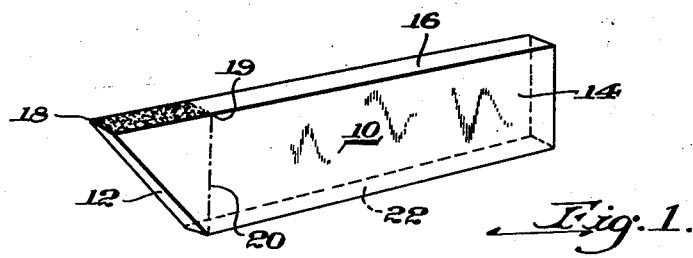

July 14, 1953     J. D. KING     2,645,471

CUTTER BIT

Filed Dec. 6, 1947

INVENTOR.
JOHN DAVID KING.

BY *Oliu E. Williams*

*his* ATTORNEY.

UNITED STATES PATENT OFFICE 2,645,471

CUTTER BIT

John David King, Clairton, Pa.

Application December 6, 1947, Serial No. 790,055

4 Claims. (Cl. 262—33)

The present invention relates in general to a method of manufacture of improved cutter bits, drills and the like, and has reference more particularly to an improved method of manufacture of a forgeable cutter bit for use in mining operations, and to the article of manufacture constituting the novel cutter bit.

In present mining practice, it is a well known procedure to undercut into sections or seams from which a material is to be mined and then to blast a section free, allowing it to drop into the space provided by the undercutting. Bits commonly used for this purpose are formed from rectangularly shaped steel blanks, the one ends of which are cut on a bias and are then sharpened by drawing or hammer forging. These bits are then fastened in a chain drive or the like and are driven at high speeds into forceful contact with the surface to be cut. Cutter bits are subjected to intensely severe operating conditions; the high speed of operation and the shattering impact with which they are driven into contact with hard rock and like heterogeneous material cause bits to shatter or rapidly to become dull and soon to wear beyond ability to resharpen.

Numerous expedients have been employed not only to avoid frequent replacement, but also to improve the cutting operation. These expedients include, for example, the employment of cutter inserts of a hard steel alloy or the practice now commonly employed of placing on the cutter edge, after forging, a welded hard steel tip which is thereafter ground to form a cutting point. The use of steel inserts has proved expensive and their retention in the shank of the bit has not been sufficiently secure to avoid their being torn from the shank under severe cutting conditions, especially when a jamming occurs and it is found necessary to reverse the cutting machine. A difference in the physical characteristics of the hard steel insert and the steel of the shank of the bit, especially under the sharp stresses occurring during cutting, causes uneven wear and shattering and often permits a loosening of the insert. On the other hand, the use of a welded tip requires a placing of a tip on the cutter edge after each sharpening, since such tips are not forgeable, and requires in addition a grinding step after the tip has been placed on the bit. Bits consisting entirely of hard cutting steels have proved prohibitively expensive and, in addition, such bits have proved impractical because they are subject to fracture and cannot be readily fastened into the commonly employed cutting machines which have a set screw fastening device to which softer steels are most suitable.

An object of the present invention is to provide an improved method for manufacturing a cutter bit having an improved cutting edge.

Another object of the present invention is the provision of an improved cutter bit.

A further object of the present invention is provision of an improved cutter bit especially suitable for coal undercutting and which can be resharpened merely by hammer or draw forging.

Yet another object is the provision of a method for the manufacture of an improved cutter bit and for the resharpening of the bit after wear.

The invention has for further objects such other improvements and such other operative advantages or results as may be found to obtain in the processes or article of manufacture hereinafter described or claimed.

In accomplishing the above objects, the present invention provides an improved cutter bit comprising a steel shank, at least the cutting face of which consists of an intimately fused welded overlay of a self-hardening abrasive-resistant forgeable alloy that contains both self-hardening and toughening metals.

The cutting face, to which the bead is applied, is that leading edge which is brought into direct contact at its tip end with the mineral face. The overlay metal is applied along this leading edge a sufficient distance back from the tip that constant abrading of the bit in service will not expose the soft steel of the shank even after many successive reforgings. In those instances, particularly when the bits are shaped by draw forging and are similarly sharpened, the opposing edge extending from the cutter tip is also coated with the welded overlay. This coating, which will be hereinafter described in greater detail, is applied primarily to prevent soft steel from being squeezed out from the shank and covering the overlay metal at the tip during such draw forging.

The invention further comprehends the method of manufacture of the cutter bits in which method initially there is applied an overlay bead of the aforesaid forgeable alloy to the cutting edge of steel blanks, ordinarily longitudinal rectangular bars, the one ends of which are usually cut at an acute angle to a longitudinal edge of the bars. Preferably the welding, either gas or electrical, should be performed at the lowest temperature at which it is observed that ready and intimate fusion of shank steel and the employed alloy occurs. The bits are then heated and hammer- or draw-forged at a preferred temperature between 1800° and 2000° F., by which forging the cutting edge is formed and sharpened. Importantly, before the forged bits have cooled below a temperature of 1450° F., they are tempered by any one of several methods of sudden cooling hereinafter described.

With particular reference to coal mining the undercutting operations therein employed use extremely large numbers of cutter bits and their maintenance and replacement constitute an important item in the overall cost of the mining. The improved cutter bit of invention and the novel method of manufacture and of resharpening such bits have been found in practice to reduce the cost of this item in coal mining to approximately 50% below that of the most economical systems heretofore employed. Therefore, the cutter bit hereinafter illustrated and described in detail is a bit so designed as to be particularly useful in coal undercutting and, hence, is set forth as a preferred embodiment of this invention.

Figure 2:
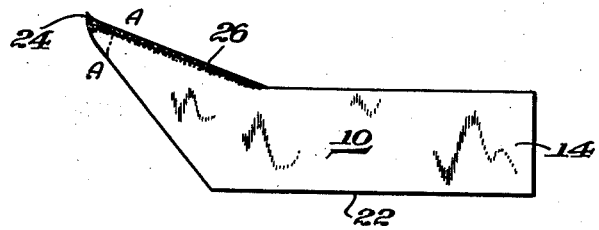
Figure 3:
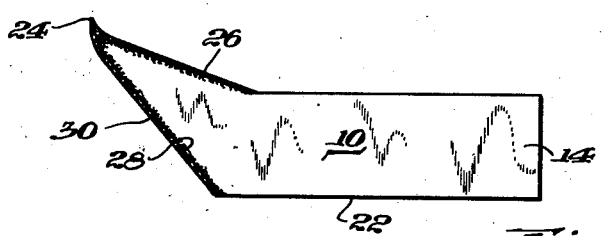
Figure 4:
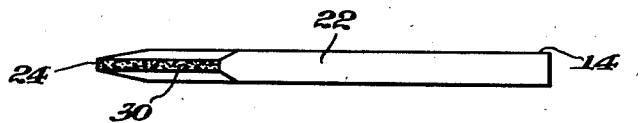

In the accompanying drawing forming a part of the specification and showing for purposes of exemplification preferred embodiments of the present invention:

Figure 1 is a perspective view of a bias-cut steel blank to which has been applied a welded bead of overlay metal, Figure 2 is an elevational view of a cutter bit formed by forging of the blank and applied weld shown in Figure 1, Figure 3 is an elevational view of a cutter bit in which both the cutter face and bias-cut face consist of an intimately fused surface of hard, forgeable overlay metal, and Figure 4 is a bottom view of the bit shown in Figure 3.

Referring particularly to Figure 1, a steel blank 10 is there shown and is provided with a bias-cut end 12 and shank-end 14. At the acute-angled intersection of the bias-cut end 12 and the longer longitudinal (top) face 16 an acute-angled edge 18 is formed. From the edge 18 a weld of self-hardening abrasive-resistant forgeable steel alloy is laid down upon and intimately fused with the said top face 16 for a distance usually equal to about the distance from the said edge 18 to the point of intersection 19 of a line 20 (shown dot-dashed on Figure 1) drawn from the intersection of the bias-cut end 12 with the shorter longitudinal bottom face 22 and at right angles to the face 16. The fused overlay can, however, be laid down for a shorter or longer distance from the edge 18 along the face 16 depending upon the amount of reserve cutting material desired for successive reforgings as hereinafter described. No great thickness of welded bead need be applied. The thickness laid down by a $\frac{3}{32}$ inch welding rod, or electrode, has been found preferable. The self-hardening, abrasive-resistant and forgeable fused overlay can be obtained by welding at the lowest feasible temperatures providing intimate fusion.

The bead of overlay metal is applied preferably electrically in the form of a $\frac{3}{32}$ inch electrode with either alternating or direct current. The overlay metal used must be a self-hardening material made up of the proper balance of alloy metals to prevent it from work-hardening to the crystallization point, or from stress-cracking and spalling off under the successive hot re-forgings which are necessary to re-sharpen the bit.

The blank 10 with applied welded overlay as shown in Figure 1 is thereafter forged into the coal cutter bit shown in Figure 2. Although the shaping and sharpening of the blank can be accomplished by hand forging it is preferably done by semi-automatic machines which either hammer-forge or draw the metal to a shape governed by the form of the dies or rolls used.

The blank 10 before forging is heated to a temperature between 1850° and 2000° F. and is thereafter immediately forged while at such temperature. After forging, the bit is tempered by controlled cooling. Tempering of the bit immediately upon completion of the shaping operation before its temperature has dropped below a crucial point of 1450° F. is essential to secure maximum service in cutting performance.

Several methods of tempering are applicable in the manufacture of cutter bits. Preferably, the bit is immersed in an oil bath for about five seconds and is then allowed to undergo normal air hardening. This tempering method provides a bit of maximum wear ability. However, a rapid compressed air cooling can be substituted for the oil-bath immersion, or the total cooling operation can be had by immersing the bit in water containing a wetting agent.

Important improvement in the useful life of the improved cutter bits has been gained by heating the finished bit to a temperature between about 700° and 800° F. thereby to relieve stresses which have been set up in the ordinary steel shank. Fractures of the bit somewhere on the shank that occasionally occurred when bits, which had not been stress relieved, were used, were substantially eliminated by the aforesaid stress relieving step.

As shown in Figure 2, the cutter bit has been re-shaped by the aforesaid forging operation and comprises the combination of the shank 14, a raked-shaped cutter point 24, and an intimately fused overlay of abrasive-resistant alloy extending from the point 24 back along face 26 which constitutes an angularly displaced portion of the longitudinal face 16 of the unforged bit.

Bits of the type shown in Figure 2 are fastened in chain cutters by means of set screws bearing upon the shank of the bit at some point between cutter point 24 and the shank end of the bit, and as the bit is shortened by successive re-forgings the bearing point is moved back toward the shank end to provide a proper cutting length when the bit is set in the machine. The cutter bit will wear, after at least three times the usage of unimproved cutter bits, in a way roughly indicated by dot-dashed line A—A as indicated on Figure 2.

After a cutter bit has become dull and the point 24 has worn down to a degree roughly indicated by the said line A—A, it is removed from service and re-forged and re-tempered in the manner hereinbefore described for manufacture of a new bit. Such re-forgings can be repeated until there is no longer any fused overlay remaining at the point 24. The length of the original overlay can be adjusted to the length of the bit shank so that the supply of overlay will be exhausted at the same time that the shank has become too short to provide a proper cutting length when set in the cutter machine. No re-welding or regrinding is required in reconditioning and sharpening the bits.

When the cutter bit is shaped and sharpened by draw forging, this drawing of the metal in successive re-forgings has been found sometimes to cause the relatively soft metal of the shank to squeeze forward and cover over the fused overlay of cutting metal at the point 24. Therefore it is preferred when draw forging is employed to lay down upon the steel blank 10, two layers of the fused overlay, (cf. Figure 3) one, the previously described layer extending from the point 24 along the upper longitudinal face 16 of the blank, and another extending from the point 24 along the bias-cut end 12 of the blank. This second layer prevents soft steel in successive re-forgings from covering the hardened point, it furnishes an additional supply of the forgeable hard cutting material where at least some of it will be drawn into formation of the cutting point after successive draw-forgings, and it will aid to a minor degree in cutting operations.

Figure 3 shows a forged bit which has been formed from a blank of which both sides of the point 24 were supplied with a fused overlay. Although the additional fused overlay 30 on the tapered edge 28 (forged from bias-cut end 12) is shown to extend from the point 24 substantially the entire distance to the intersection of the bias-cut end 12 with the bottom, longitudinal face 22, adequate results can be obtained when only a part of the bias-cut end from the point 24 is covered with the fused overlay.

Figure 4 is a view of the base of the cutter bit shown in Figure 3 but, in shape, could as well be the cutter bit of Figure 2, and is presented particularly to show the manner in which the bias-cut end is sharpened by the forging. A tapered edge 28, that is formed by said forging, extends from along the bias-cut end from the raked point 24 to the longitudinal face 22. The said edge 30 is covered with the fused overlay for its entire length as indicated in the Figure 4.

In an example of manufacture of cutter bits according to the present invention, bias-cut steel blanks four inches long, one inch wide, and one-half inch thick were used. The steel conformed to the following specifications:

Not less than 0.75% by weight carbon.
Not more than 0.85% by weight carbon.
Not less than 0.45% by weight manganese.
Not more than 0.55% by weight manganese.
Not less than 0.15% by weight silicon.
Not more than 0.20% by weight silicon.

A bead of overlay metal was applied electrically to each bit by means of a welding machine using alternating current and the temperature of welding was kept as low as possible and yet provide proper fusion of the metals. The deposit of self-hardening overlay metal was laid down on both the bias-cut face and along the longitudinal thickness of the bit to a point in each instance about 1½ inches back from the intersection of the bias-cut end and the said longitudinal face. The deposit contained the following percentages of alloy metals:

1.51% by weight carbon.
0.46% by weight manganese.
1.12% by weight silicon.
7.75% by weight chromium.
0.03% by weight nickel.
0.04% by weight vanadium.

The bits were then heated to a temperature between 1850° and 2000° F. and were draw-forged in a semi-automatic machine of the type hereinbefore mentioned. Immediately after forging and before the bits had dropped in temperature below 1450° F., they were immersed in an oil bath for about five seconds, and were then subjected to normal air hardening. The bits were then reheated to about 750° F. to relieve stresses set up by the forging operations in the ordinary steel of the shank. Bits manufactured as above described were tested in cutting operations of all types over a six-month period and were found to average three cuts to every one previously made with old-type bits.

The provision of a reserve supply of hard cutting metal as an integral part of each bit and the novel employment of a forgeable alloy for this purpose eliminate at least two steps in re-sharpening of cutter-bits because only a re-forging need be performed and no re-application of overlay need be made nor is any grinding step necessary.

It is understood that the successive re-forgings to which it is possible to subject the improved cutter bit is economically an important aspect of the improvement. Another factor of economic importance is that the improved method of invention can be employed as readily in the manufacture of new bits from old worn bits as it is in the manufacture of bits from unused steel blanks and the claims hereinafter given comprehend as an obvious application such manufacture of new bits from old.

The information as hereinabove set forth is embodied in particular form and manner but may be variously embodied within the scope of the claims hereinafter made.

I claim:

1. A cutter bit comprising the combination of a supporting, steel shank and a cutting portion having a hard cutting edge consisting of a layer of an abrasive-resistant self-hardening forgeable steel alloy that is intimately fused upon a shank edge formed by the intersection of two faces of the shank which alloy layer extends along two sides from the shank edge.

2. A cutter bit comprising the combination of a supporting, steel shank and a raked shaped cutting portion having a sharpened, hard cutting edge consisting of an intimately fused layer of an abrasive-resistant self-hardening forgeable steel alloy disposed upon an edge formed by intersection of two faces of the shank and extending along two faces of the shank from the shank edge and of sufficient thickness so as to provide residual steel alloy upon the cutting edge after successive wear-periods and re-forgings.

3. An improved cutter bit comprising the combination of a supporting steel shank having opposite faces of wider dimension relative to narrower sides, and a cutting portion at one end of said shank having a sharp hard cutting-edge that consists of a layer of an abrasive-resistant self-hardening forgeable steel alloy intimately fused with the steel shank upon an edge that is formed by the intersection of two of the narrower sides at the said one end of the shank and extending from said shank edge along both of the said two narrower sides.

4. The cutter bit of claim 3 in which the intimately fused alloy layer, which forms the cutting edge and which extends from the shank edge along the two faces of the shank, is deposited upon the shank in sufficient thickness to permit resharpening of the cutting edge without exposure of abradable steel.

JOHN DAVID KING.

References Cited in the file of this patent
UNITED STATES PATENTS

| Number | Name | Date |
|---|---|---|
| 475,314 | Hirsch | May 24, 1892 |
| 501,755 | Bain | July 18, 1893 |
| 1,025,735 | Bosredon | May 7, 1912 |
| 1,375,453 | Hadfield | Apr. 19, 1921 |
| 1,424,536 | Wenger | Aug. 1, 1922 |
| 1,841,268 | McKinlay | Jan. 12, 1932 |
| 1,960,879 | Russell | May 29, 1934 |
| 2,040,852 | Joy | May 19, 1936 |